(12) United States Patent
Cao (10) Patent No.: US 12,078,616 B2
(45) Date of Patent: Sep. 3, 2024

(54) SYSTEM AND METHOD FOR TESTING DYNAMIC PROPERTIES OF MATERIAL UNDER COMPLEX STRESS STATE

(71) Applicant: Shaanxi Dagong Xuhang Electromagnetic Technology Co., Ltd., Xi'an (CN)

(72) Inventor: Zengqiang Cao, Xi'an (CN)

(73) Assignee: Shaanxi Dagong Xuhang Electromagnetic Technology Co., Ltd., Xi'an (CN)

(*) Notice: Subject to any disclaimer, the term of this patent is extended or adjusted under 35 U.S.C. 154(b) by 333 days.

(21) Appl. No.: 17/673,562

(22) Filed: Feb. 16, 2022

(65) Prior Publication Data

US 2022/0291100 A1    Sep. 15, 2022

(30) Foreign Application Priority Data

Mar. 15, 2021 (CN) .......................... 202110278221.5

(51) Int. Cl.
| | |
|---|---|
| *G01N 3/08* | (2006.01) |
| *G01N 3/02* | (2006.01) |
| *G01N 3/22* | (2006.01) |
| *G01N 3/317* | (2006.01) |

(52) U.S. Cl.
CPC ............. *G01N 3/08* (2013.01); *G01N 3/317* (2013.01); *G01N 3/02* (2013.01); *G01N 3/22* (2013.01); *G01N 2203/0017* (2013.01); *G01N 2203/0019* (2013.01); *G01N 2203/005* (2013.01); *G01N 2203/0075* (2013.01); *G01N 2203/0252* (2013.01); *G01N 2203/0254* (2013.01)

(58) Field of Classification Search
CPC ..... G01N 2203/005; G01N 2203/0017; G01N 2203/0019; G01N 2203/0254; G01N 2203/0252; G01N 2203/0075; G01N 3/317; G01N 3/02; G01N 3/22; G01N 3/08

See application file for complete search history.

(56) References Cited

U.S. PATENT DOCUMENTS

2020/0408483 A1\* 12/2020 Cao ........................ A62C 3/025

FOREIGN PATENT DOCUMENTS

| CN | 103926138 A | \* | 7/2014 | |
|---|---|---|---|---|
| CN | 104535419 A | \* | 4/2015 | |
| CN | 104677760 A | \* | 6/2015 | |
| CN | 104678852 A | \* | 6/2015 | |
| CN | 104678853 A | \* | 6/2015 | ............. G05B 19/04 |
| CN | 108267366 A | \* | 7/2018 | ............... G01N 3/08 |

(Continued)

*Primary Examiner* — Jonathan M Dunlap
(74) *Attorney, Agent, or Firm* — Rimon PC (57) ABSTRACT

The present disclosure provides a system and method for testing dynamic properties of a material under a complex stress state, and belongs to the technical field of dynamic mechanical property tests. The system includes a control circuit system, a loading system, and a signal acquisition system. Based on the electromagnetic loading technology, the control circuit system controls charging and discharging of the loading system, the loading system loads the material, and the signal acquisition system acquires material strains and time characteristics during loading. The control circuit system can discharge 4 discharge coils simultaneously through the same discharging silicon-controlled rectifier (SCR), realizing biaxial bidirectional synchronous loading.

14 Claims, 5 Drawing Sheets

(56) References Cited

FOREIGN PATENT DOCUMENTS

| CN | 108344648 | A | * | 7/2018 | ............. G01N 3/317 |
| CN | 108344649 | A | * | 7/2018 | ............. G01N 3/317 |
| CN | 108519283 | A | * | 9/2018 | |
| CN | 108519296 | A | * | 9/2018 | |
| CN | 110307749 | A | * | 10/2019 | ............. A62C 19/00 |
| WO | WO-2021043195 | A1 | * | 3/2021 | ............... G01N 3/02 |

* cited by examiner

A system and method for testing dynamic properties of material under complex stress state

SYSTEM AND METHOD FOR TESTING DYNAMIC PROPERTIES OF MATERIAL UNDER COMPLEX STRESS STATE

CROSS REFERENCE TO RELATED APPLICATION

This patent application claims the benefit and priority of Chinese Patent Application No. 202110278221.5, filed on Mar. 15, 2021, the disclosure of which is incorporated by reference herein in its entirety as part of the present application.

TECHNICAL FIELD

The present disclosure belongs to the technical field of dynamic mechanical property tests, and in particular to a system and method for testing dynamic properties of a material under a complex stress state.

BACKGROUND ART

In the fields of aerospace and weapons, materials are often subjected to dynamic loads such as impact and explosion. The measurement of dynamic mechanical properties of materials is very important for optimal design of structural impact and explosion resistance. The Hopkinson bar is an effective mean to measure the dynamic mechanical properties of materials, including the Hopkinson tension bar and the Hopkinson compression bar. The tension bar is used to measure uniaxial dynamic tensile properties of materials, and the compression bar is used to measure uniaxial dynamic compression properties of materials.

In actual service, the material is usually in a complex multiaxial stress state, and the dynamic mechanical property test of the material under the multiaxial stress state is critical to the optimal design of the structure. However, the traditional Hopkinson tensile/compression bar test technology usually uses an air gun to accelerate a short bar. The short bar is used to hit an incident bar to generate a loading stress wave. The loading speed repeatability error is large, and the acceleration process of the short bar is difficult to accurately control, which cannot meet the strict requirements for the synchronization and equivalence of multiaxial loading in the measurement of multiaxial dynamic mechanical properties of the material.

Compared with the traditional Hopkinson bar based on air gun loading, the Hopkinson bar based on electromagnetic loading has many advantages such as small size, good loading controllability, and high loading accuracy. The patents with patent numbers 201810121019.X and 201811137384.6 respectively disclose a system and method for testing dynamic properties of a material under a complex stress state, a dynamic biaxial bidirectional tensile loading device and experimental method, and a biaxial bidirectional compressive loading device and a method thereof. The above patents use an electromagnetic force as a loading force to improve the controllability and loading accuracy of a loading stress wave. At the same time, a time delay generator is used to realize time synchronization of loading waves in different directions. However, due to the influence of the environment, the discharge delay of a discharging silicon controlled rectifier (SCR) is uncertain. The time delay generator cannot fully guarantee synchronous discharging of multiaxial loading, and the time delay generator is expensive. In addition, the above patents can only realize multiaxial tension or multiaxial compression, and cannot realize the multiaxial tensile/compressive test at the same time, and there are manufacturing errors in transverse and longitudinal capacitor banks and four discharge coils, resulting in differences in peak loading waves of the electromagnetic force excited by each loading coil. The loading equivalence of each axis cannot be guaranteed. The patent with patent number 201810120975.6 discloses a system and method for testing dynamic properties of a material under a complex stress state, and a uniaxial bidirectional loading split Hopkinson compression bar and tension bar device and experimental method. This patent connects two electromagnetic force loading guns in parallel on a capacitor bank and a discharging SCR to realize synchronous loading. However, this patent uses two discharging SCRs to control the discharging of two discharge coils respectively. The discharge delay error of the discharging SCR still exists, and the differences in peak loading waves of the electromagnetic force caused by the manufacturing error of the discharge coils is difficult to avoid. Multidirectional synchronous equivalent loading cannot be fully guaranteed.

SUMMARY

An objective of the present disclosure is to provide a system and method for testing dynamic properties of a material under a complex stress state, so as to solve the above-mentioned problems in the background art.

In order to achieve the above objective, according to a first aspect of the present disclosure, the present disclosure provides a system for testing dynamic properties of a material under a complex stress state, including a loading system for loading the material, a control circuit system for controlling charging and discharging of the loading system, and a signal acquisition system for acquiring material strain and time signals during loading.

Further, the loading system may include a No. 1 transverse loading gun, a No. 2 transverse loading gun, a No. 1 longitudinal loading gun, a No. 2 longitudinal loading gun, 4 loading bars, and a test piece.

Further, the No. 1 transverse loading gun may include a No. 1 transverse tensile branch equivalent resistor RT-X1, a No. 1 transverse tensile discharge coil, a No. 1 transverse tensile secondary coil, a No. 1 transverse tensile stress wave amplifier, a No. 1 transverse compressive branch equivalent resistor RB-X1, a No. 1 transverse compressive discharge coil, a No. 1 transverse compressive secondary coil, a No. 1 transverse compressive stress wave amplifier, and a No. 1 transverse loading gun base.

Further, the 4 loading bars may be identical, including a No. 1 transverse loading bar, a No. 2 transverse loading bar, a No. 1 longitudinal loading bar, and a No. 2 longitudinal loading bar;

one end of the No. 1 transverse loading bar may be connected with the No. 1 transverse loading gun, and the other end may be connected with the test piece to perform tensile/compressive loading on a left side of the test piece;

one end of the No. 2 transverse loading bar may be connected with the No. 2 transverse loading gun, and the other end may be connected with the test piece to perform tensile/compressive loading on a right side of the test piece;

one end of the No. 1 longitudinal loading bar may be connected with the No. 1 longitudinal loading gun, and the other end may be connected with the test piece to perform tensile/compressive loading on a lower part of the test piece; and one end of the No. 2 longitudinal loading bar may be connected with the No. 2 longitudinal loading gun, and the other end may be connected with the test piece to perform tensile/compressive loading on an upper part of the test piece.

Further, the control circuit system may include a booster, a charging SCR, a rectifier diode, a charging control unit, a current-limiting resistor, a filter inductor, a capacitor bank, a bleeder resistor, a bleeder switch, a discharging SCR, a discharging control unit, a uniaxial and biaxial loading switch, and a tensile/compressive loading test switch; and the booster may boost a 380 V alternating current, and after boosting, the charging control unit may control the charging SCR to charge the capacitor bank; during charging, the rectifier diode may rectify the alternating current, the filter inductor may further filter a charging current, and the current-limiting resistor may limit a current of the charging circuit to protect the capacitor bank at the same time; after the capacitor bank is charged, the discharging control unit may control the discharging SCR to discharge the loading system, and the loading system may excite an electromagnetic force to load the material; after the capacitor bank is discharged, there may be a residual voltage due to reverse charging, or after the capacitor bank is charged, the loading system may not be discharged, the bleeder switch may be closed, and the bleeder resistor may consume excess energy stored in the capacitor bank to ensure safety of an operator; the uniaxial and biaxial loading switch may be used for switching between uniaxial loading and biaxial loading, the switch may be opened for a biaxial loading test, and the switch may be closed for a uniaxial loading test; and the tensile/compressive loading test switch may be used for switching between a tensile test and a compressive test of the material, when the tensile/compressive loading test switch is connected to a circuit contact a, the loading system may be in a tensile property test state, and when the tensile/compressive loading test switch is connected to a circuit contact b, the loading system may be in a compressive property test state.

Further, the signal acquisition system may include:

4 strain gauges, attached to a No. 1 transverse loading bar, a No. 2 transverse loading bar, a No. 1 longitudinal loading bar, and a No. 2 longitudinal loading bar respectively to sense loading stress during loading; and a signal acquisition device, connected with output terminals of the 4 strain gauges to acquire strain and time signals.

Further, during a tensile test, a No. 1 transverse tensile discharge coil, a No. 2 transverse tensile discharge coil, a No. 1 longitudinal tensile discharge coil, and a No. 2 longitudinal tensile discharge coil may be controlled for discharging by the same capacitor bank through the same discharging SCR, so as to ensure that the 4 discharge coils are discharged synchronously, and then to ensure that 4 loading guns are loaded synchronously; the 4 tensile discharge coils may be connected with the discharging SCR by parallel connection and hybrid connection methods; the parallel connection method may be used in the following conditions: the control circuit system has low boosting capacity but high resistance to heavy currents, the No. 1 transverse tensile discharge coil, the No. 2 transverse tensile discharge coil, the No. 1 longitudinal tensile discharge coil, and the No. 2 longitudinal tensile discharge coil may be respectively connected in series with a corresponding branch equivalent resistor, then connected in parallel with each other, and then connected with the discharging SCR, such that the 4 tensile discharge coils are discharged synchronously; and the hybrid connection method may be used in the following conditions: the control circuit system has high boosting capacity but low resistance to heavy currents, and the No. 1 transverse tensile discharge coil may be connected in parallel with the No. 2 transverse tensile discharge coil, the No. 1 longitudinal tensile discharge coil may be connected in parallel with the No. 2 longitudinal tensile discharge coil, and the parallel transverse tensile discharge coils may be connected in series with the parallel longitudinal tensile discharge coils, and then connected with the discharging SCR.

Further, peak electromagnetic forces of tensile discharge coils may be compensated by a branch equivalent resistor corresponding to the tensile discharge coils, such that peak loading forces excited by the 4 tensile discharge coils during loading are the same, so as to realize biaxial bidirectional equivalent loading; and the peak electromagnetic force $F_{max}$ generated by the 4 tensile discharge coils and their respective branch equivalent resistor R is represented by a formula:

$$F_{max} = \kappa R + \beta \qquad (1),$$

in the above formula, $\kappa$ and $\beta$ may be circuit constants corresponding to the discharge coils respectively; the branch circuit constants $\kappa$ and $\beta$ corresponding to the 4 tensile discharge coils in the formula (1) may be obtained through experimental tests respectively; then the peak electromagnetic forces of the 4 tensile discharge coils under a fixed voltage may be measured, it may be assumed that a maximum of the 4 peak electromagnetic forces is $F'_{max}$, and in order to ensure equivalent loading, the peak electromagnetic forces of the remaining 3 tensile discharge coils may be increased; it may be further assumed that any one of the remaining 3 peak electromagnetic forces is $F''_{max}$, and the branch equivalent resistor $R''$ corresponding to $F''_{max}$ may be adjusted according to the formula (1) to increase the peak electromagnetic force $F''_{max}$ so as to make it equal to $F'_{max}$; and according to the formula (1), an adjustment amount $\Delta R''$ of the branch equivalent resistor $R''$ corresponding to $F''_{max}$ may meet:

$$\Delta R'' = (F'_{max} - F''_{max})/\kappa'' \qquad (2),\text{ and}$$

in the above formula, $\kappa''$ may be a branch circuit constant corresponding to the tensile discharge coil corresponding to the peak electromagnetic force $F''_{max}$.

Further, during a compressive test, a method for ensuring biaxial bidirectional synchronous equivalent loading may be the same as that of a tensile test, that is, a method for connecting 4 compressive discharge coils may be the same as that of the tensile test, and a method for compensating peak electromagnetic forces of the 4 compressive discharge coils may be the same as that of the tensile test.

According to a second aspect of the present disclosure, the present disclosure provides a method for testing dynamic properties of a material under a complex stress state, specifically including the following operation processes:

step 1, according to requirements of a loading test of the material, selecting tensile loading or compressive loading using a tensile/compressive loading test switch, controlling a pulse width of a loading force using a capacitor bank and a number of turns of a discharge coil, and controlling a peak loading force using a discharge voltage of the capacitor bank;

step 2, setting the discharge voltage of the capacitor bank required for the loading test in a charging control unit, measuring peak electromagnetic forces corresponding to the 4 discharge coils under this discharge voltage, and compensating the peak electromagnetic forces by adjusting branch equivalent resistor according to the formula (2), such that the peak electromagnetic forces of the 4 discharge coils after compensation are the same under this discharge voltage;

step 3, placing a test piece in a center of 4 loading bars, and starting the charging control unit to charge the capacitor bank;

step 4, after charging is completed, starting a discharging control unit, discharging the 4 discharge coils by the capacitor bank through a discharging SCR simultaneously, exciting a changing strong magnetic field by the 4 discharge coils, and further exciting an induced magnetic field of 4 secondary coils, where the changing strong magnetic field of the 4 discharge coils may interact with the induced magnetic field of their respective secondary coils to generate an electromagnetic pulse force stress wave; performing transverse symmetric equivalent loading on the test piece by an electromagnetic pulse force through a No. 1 transverse loading bar and a No. 2 transverse loading bar respectively, and performing longitudinal symmetric equivalent loading on the test piece through a No. 1 longitudinal loading bar and a No. 2 longitudinal loading bar; and acquiring strain signals in the 4 loading bars during loading by 4 strain gauges respectively and transmitting the signals to a signal acquisition device; and step 5, according to 4 strain and time signals acquired by the signal acquisition device, obtaining dynamic mechanical properties of the material under a biaxial bidirectional stress state.

Compared with the prior art, the present disclosure has the following beneficial effects:

In the present disclosure, based on the electromagnetic riveting technology, the control circuit system can discharge 4 discharge coils simultaneously through the same discharging SCR, realizing biaxial bidirectional synchronous loading. The loading system compensates peak electromagnetic forces using a branch equivalent resistor according to a dependence relationship between the peak electromagnetic force of a branch discharge coil and the branch equivalent resistor, ensuring that peak electromagnetic loading forces of the 4 discharge coils are the same, and realizing biaxial bidirectional equivalent loading. The bleeder switch and the bleeder resistor are designed to consume excess energy stored in the capacitor bank, improving the test safety. The present disclosure unifies biaxial bidirectional Hopkinson compression bar and tension bar experimental loading tests through reasonable structural design and circuit design, expands a testing range, and reduces the volume of the system.

In the figures: 1—booster, 2—charging SCR, 3—rectifier diode, 4—charging control unit, 5—current-limiting resistor, 6—filter inductor, 7—capacitor bank, 8—bleeder resistor, 9—bleeder switch, 10—discharging SCR, 11—discharging control unit, 12—No. 1 transverse tensile branch equivalent resistor RT-X1, 13—No. 1 transverse tensile discharge coil, 14—No. 1 transverse tensile secondary coil, 15—No. 1 transverse tensile stress wave amplifier, 16—No. 2 transverse tensile branch equivalent resistor RT-X2, 17—No. 2 transverse tensile discharge coil, 18—No. 2 transverse tensile secondary coil, 19—No. 2 transverse tensile stress wave amplifier, 20—No. 1 longitudinal tensile branch equivalent resistor RT-Y1, 21—No. 1 longitudinal tensile discharge coil, 22—No. 1 longitudinal tensile secondary coil, 23—No. 1 longitudinal tensile stress wave amplifier, 24—No. 2 longitudinal tensile branch equivalent resistor RT-Y2, 25—No. 2 longitudinal tensile discharge coil, 26—No. 2 longitudinal tensile secondary coil, 27—No. 2 longitudinal tensile stress wave amplifier, 28—uniaxial and biaxial loading switch, 29—No. 1 transverse compressive branch equivalent resistor RB-X1, 30—No. 1 transverse compressive discharge coil, 31—No. 1 transverse compressive secondary coil, 32—No. 1 transverse compressive stress wave amplifier, 33—No. 2 transverse compressive branch equivalent resistor RB-X2, 34—No. 2 transverse compressive discharge coil, 35—No. 2 transverse compressive secondary coil, 36—No. 2 transverse compressive stress wave amplifier, 37—No. 1 longitudinal compressive branch equivalent resistor RB-Y1, 38—No. 1 longitudinal compressive discharge coil, 39—No. 1 longitudinal compressive secondary coil, 40—No. 1 longitudinal compressive stress wave amplifier, 41—No. 2 longitudinal compressive branch equivalent resistor RB-Y2, 42—No. 2 longitudinal compressive discharge coil, 43—No. 2 longitudinal compressive secondary coil, 44—No. 2 longitudinal compressive stress wave amplifier, 46—tensile/compressive loading test switch, a, b-circuit contact, 47—No. 1 transverse loading gun base, 48—No. 2 transverse loading gun base, 49—No. 1 longitudinal loading gun base, 50—No. 2 longitudinal loading gun base, 51—No. 1 transverse loading bar, 52—No. 2 transverse loading bar, 53—No. 1 longitudinal loading bar, 54—No. 2 longitudinal loading bar, 55—strain gauge, 56—test piece, and 57—signal acquisition device.

DETAILED DESCRIPTION OF THE EMBODIMENTS

The technical solutions in the embodiments of the present disclosure will be clearly and completely described below with reference to the drawings in the embodiments of the present disclosure. All other implementations obtained by those of ordinary skill in the art without creative efforts shall fall within the protection scope of the present disclosure.

With reference to FIG. 1 to FIG. 5, in order to measure dynamic mechanical properties of a material under a multiaxial stress state, the present disclosure provides a system and method for testing dynamic properties of a material under a complex stress state, unifies biaxial bidirectional Hopkinson compression bar and tension bar experimental loading tests, realizes biaxial bidirectional synchronous equivalent loading of the material, and can realize uniaxial bidirectional synchronous equivalent loading of the material at the same time.

In order to achieve the above objective, the present disclosure includes the following characteristics.

Components of the system of the present disclosure include a control circuit system, a loading system, and a signal acquisition system. The control circuit system controls charging and discharging of the loading system, the loading system loads the material, and the signal acquisition system acquires material strain and time signals during loading.

Specifically, the loading system includes a No. 1 transverse loading gun, a No. 2 transverse loading gun, a No. 1 longitudinal loading gun, a No. 2 longitudinal loading gun, 4 loading bars, and a test piece.

Specifically, the No. 1 transverse loading gun includes a No. 1 transverse tensile branch equivalent resistor RT-X1, a No. 1 transverse tensile discharge coil, a No. 1 transverse tensile secondary coil, a No. 1 transverse tensile stress wave amplifier, a No. 1 transverse compressive branch equivalent resistor RB-X1, a No. 1 transverse compressive discharge coil, a No. 1 transverse compressive secondary coil, a No. 1 transverse compressive stress wave amplifier, and a No. 1 transverse loading gun base.

Specifically, the 4 loading bars are identical, including a No. 1 transverse loading bar, a No. 2 transverse loading bar, a No. 1 longitudinal loading bar, and a No. 2 longitudinal loading bar.

One end of the No. 1 transverse loading bar is connected with the No. 1 transverse loading gun, and the other end is connected with the test piece to perform tensile/compressive loading on a left side of the test piece.

One end of the No. 2 transverse loading bar is connected with the No. 2 transverse loading gun, and the other end is connected with the test piece to perform tensile/compressive loading on a right side of the test piece.

One end of the No. 1 longitudinal loading bar is connected with the No. 1 longitudinal loading gun, and the other end is connected with the test piece to perform tensile/compressive loading on a lower part of the test piece.

One end of the No. 2 longitudinal loading bar is connected with the No. 2 longitudinal loading gun, and the other end is connected with the test piece to perform tensile/compressive loading on an upper part of the test piece.

Specifically, the control circuit system includes a booster, a charging SCR, a rectifier diode, a charging control unit, a current-limiting resistor, a filter inductor, a capacitor bank, a bleeder resistor, a bleeder switch, a discharging SCR, a discharging control unit, a uniaxial and biaxial loading switch, and a tensile/compressive loading test switch.

The booster boosts a 380 V alternating current, and after boosting, the charging control unit controls the charging SCR to charge the capacitor bank. During charging, the rectifier diode rectifies the alternating current, the filter inductor further filters a charging current, and the current-limiting resistor limits a current of the charging circuit to protect the capacitor bank at the same time. After the capacitor bank is charged, the discharging control unit controls the discharging SCR to discharge the loading system, and the loading system excites an electromagnetic force to load the material. After the capacitor bank is discharged, there is a residual voltage due to reverse charging, or after the capacitor bank is charged, the loading system is not discharged, the bleeder switch is closed, and the bleeder resistor consumes excess energy stored in the capacitor bank to ensure safety of an operator. The uniaxial and biaxial loading switch is used for switching between uniaxial loading and biaxial loading, the switch is opened for a biaxial loading test, and the switch is closed for a uniaxial loading test. The tensile/compressive loading test switch is used for switching between a tensile test and a compressive test of the material, when the tensile/compressive loading test switch is connected to a circuit contact a, the loading system is in a tensile property test state, and when the tensile/compressive loading test switch is connected to a circuit contact b, the loading system is in a compressive property test state.

Specifically, the signal acquisition system includes strain gauges and a signal acquisition device.

The 4 strain gauges are attached to a No. 1 transverse loading bar, a No. 2 transverse loading bar, a No. 1 longitudinal loading bar, and a No. 2 longitudinal loading bar respectively to sense loading stress during loading.

The signal acquisition device is connected with output terminals of the 4 strain gauges to acquire strain and time signals.

Specifically, biaxial bidirectional synchronous equivalent loading of the implementation of the present disclosure is as follows.

Figure 1:
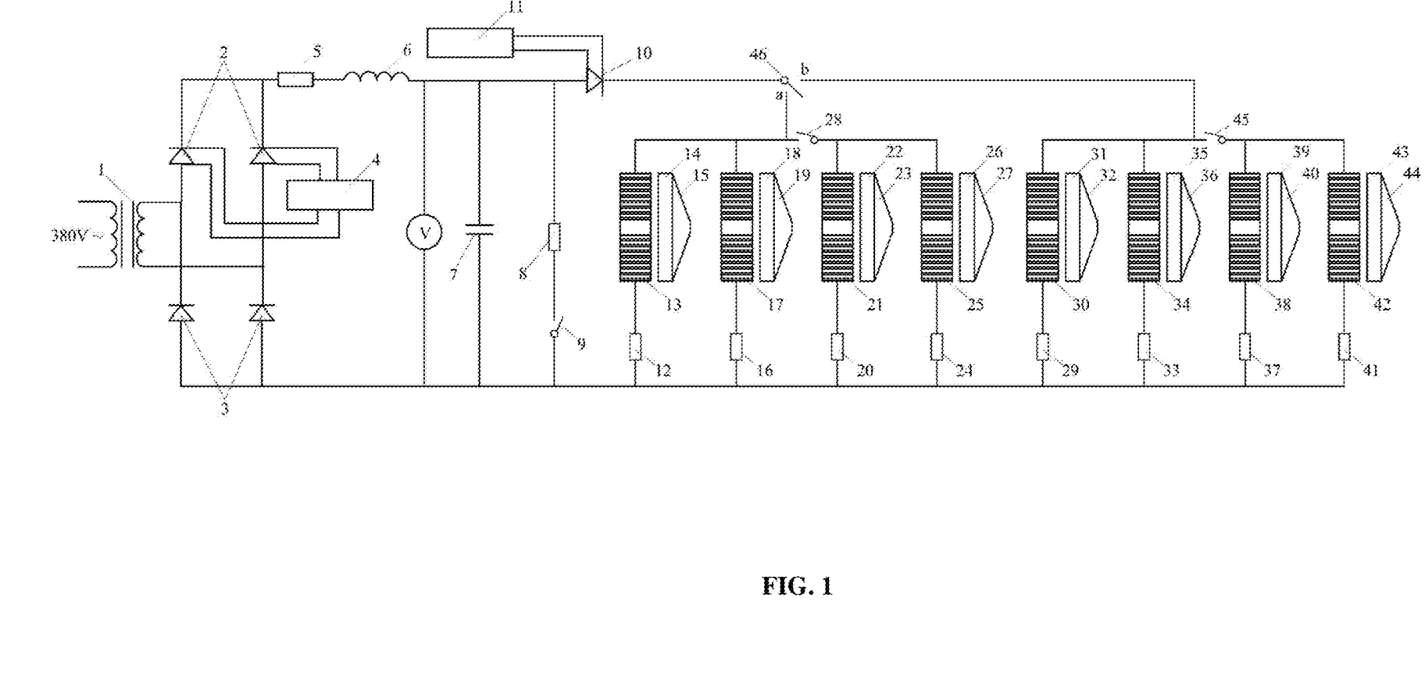
FIG. 1 is a schematic diagram of circuit connection in a parallel connection method of discharge coils according to a method of the present disclosure.
Figure 2:
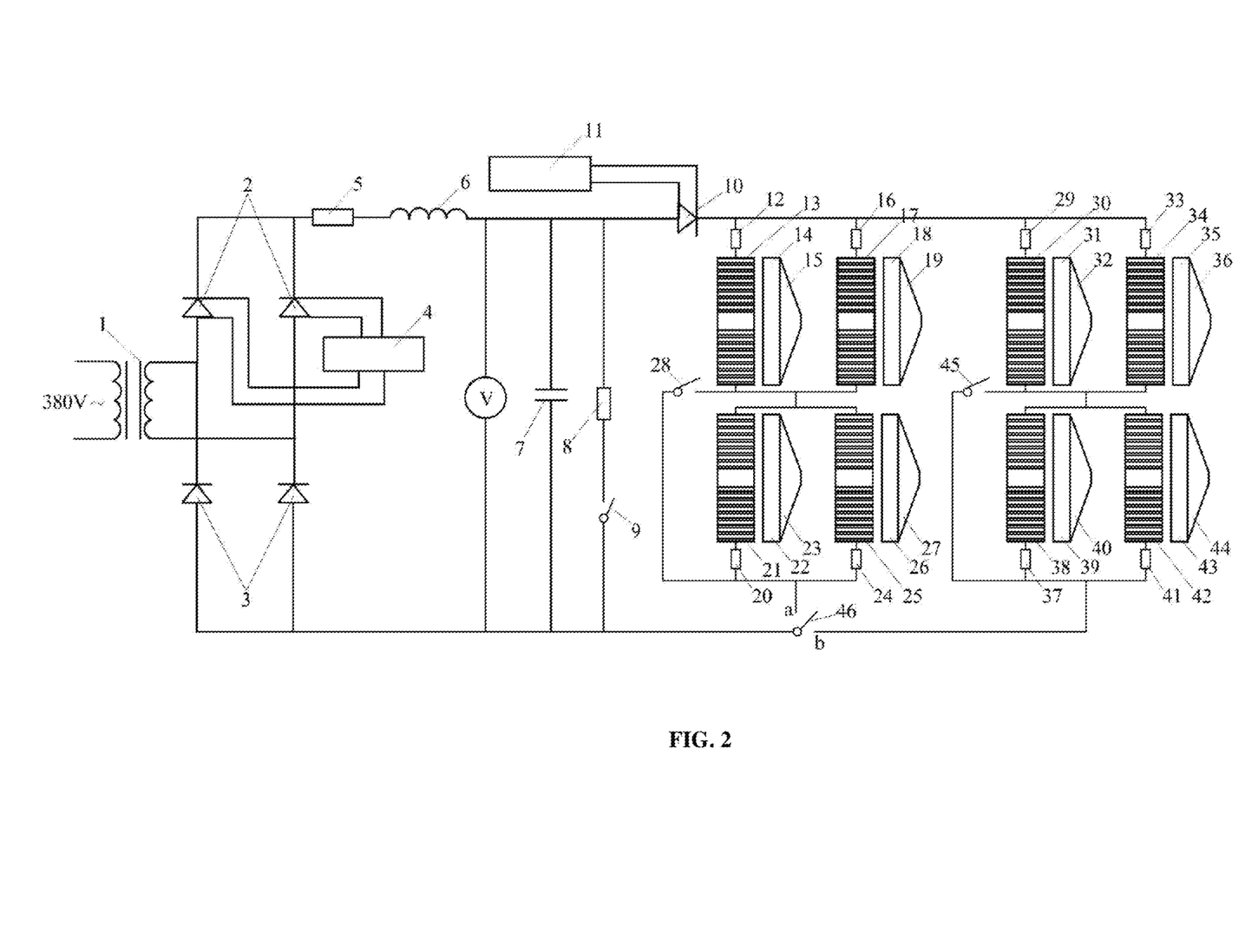
FIG. 2 is a schematic diagram of circuit connection in a hybrid connection method of the discharge coils according to the method of the present disclosure.
Figure 3:
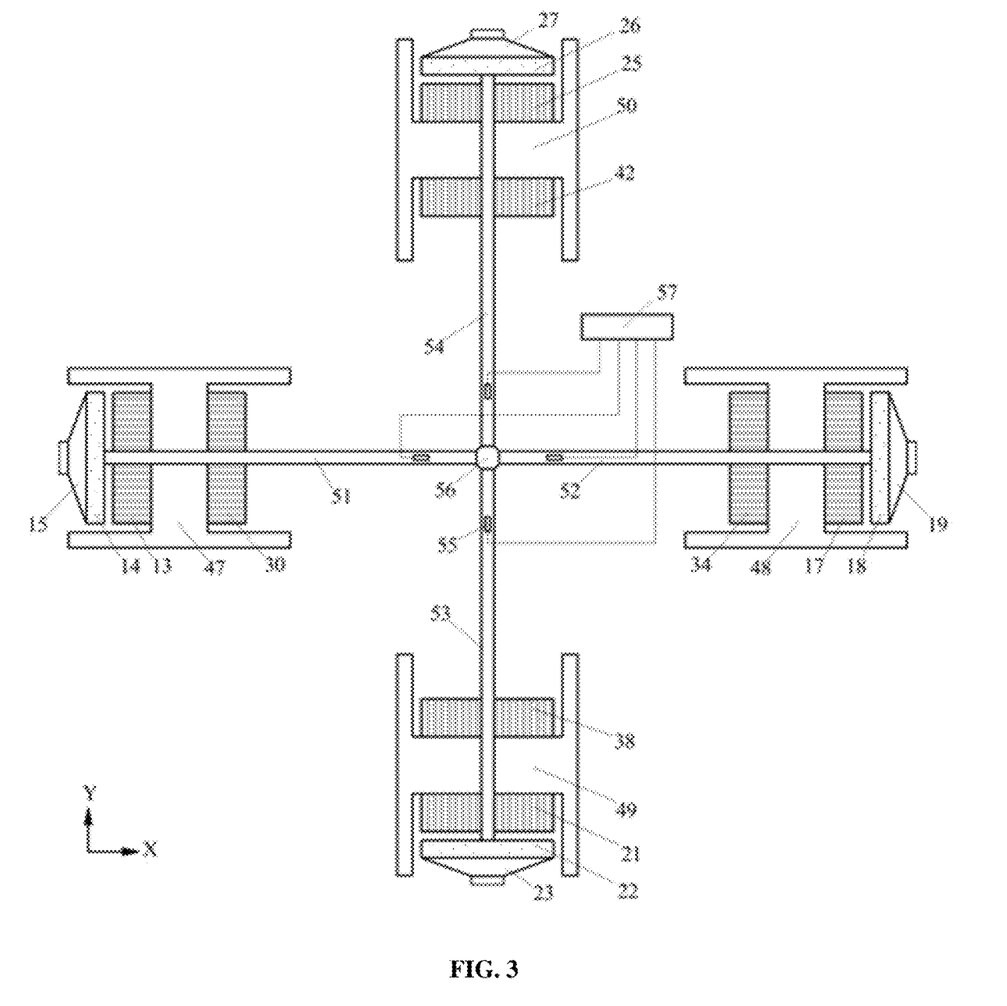
FIG. 3 is a schematic diagram of a biaxial bidirectional dynamic tensile loading test of a material according to the method of the present disclosure.

During a tensile test, a No. 1 transverse tensile discharge coil, a No. 2 transverse tensile discharge coil, a No. 1 longitudinal tensile discharge coil, and a No. 2 longitudinal tensile discharge coil are controlled for discharging by the same set of capacitor bank through the same discharging SCR, so as to ensure that the 4 discharge coils are discharged synchronously, and then to ensure that 4 loading guns are loaded synchronously. The 4 tensile discharge coils are connected with the discharging SCR by parallel connection and hybrid connection methods. The parallel connection method is used in the following conditions: the control circuit system has low boosting capacity but high resistance to heavy currents, the No. 1 transverse tensile discharge coil, the No. 2 transverse tensile discharge coil, the No. 1 longitudinal tensile discharge coil, and the No. 2 longitudinal tensile discharge coil are respectively connected in series with corresponding branch equivalent resistor, then connected in parallel with each other, and then connected with the discharging SCR, such that the 4 tensile discharge coils are discharged synchronously. The hybrid connection method is used in the following conditions: the control circuit system has high boosting capacity but low resistance to heavy currents, and the No. 1 transverse tensile discharge coil is connected in parallel with the No. 2 transverse tensile discharge coil, the No. 1 longitudinal tensile discharge coil is connected in parallel with the No. 2 longitudinal tensile discharge coil, and the parallel transverse tensile discharge coils are connected in series with the parallel longitudinal tensile discharge coils, and then connected with the discharging SCR.

Figure 5:
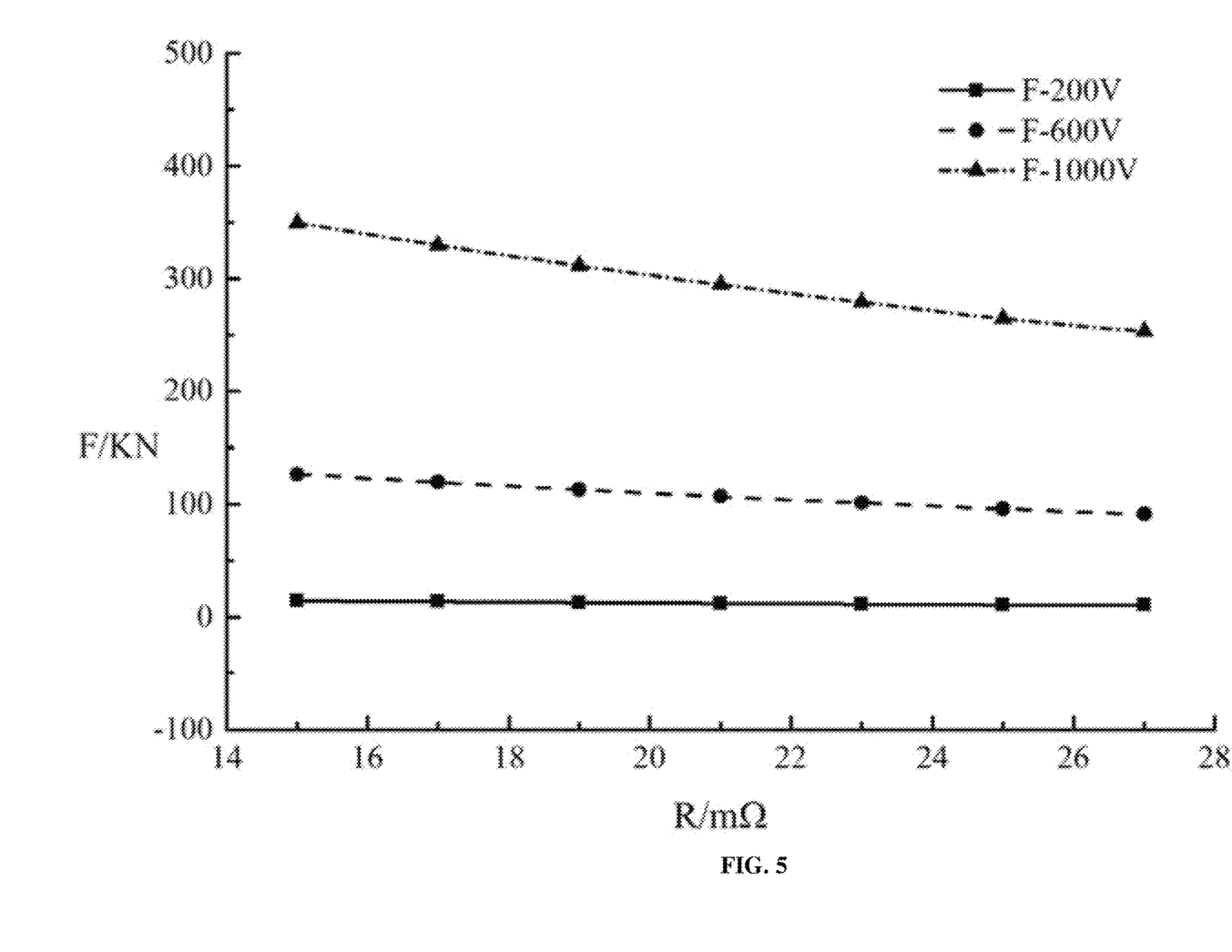
FIG. 5 shows a mapping relationship between a peak electromagnetic force of a single discharge coil and a corresponding branch equivalent resistor according to the method of the present disclosure.

Specifically, peak electromagnetic forces of tensile discharge coils are compensated by a branch equivalent resistor corresponding to the tensile discharge coils, such that peak loading forces excited by the 4 tensile discharge coils during loading are the same, so as to realize biaxial bidirectional equivalent loading. The peak electromagnetic force $F_{max}$ generated by the 4 tensile discharge coils and their respective branch equivalent resistor R meet a formula:

$$F_{max} = \kappa R + \beta \quad (1).$$

In the above formula, $\kappa$ and $\beta$ are circuit constants corresponding to the discharge coils respectively. The branch circuit constants $\kappa$ and $\beta$ corresponding to the 4 tensile discharge coils in the formula (1) are obtained through experimental tests respectively. Then the peak electromagnetic forces of the 4 tensile discharge coils under a fixed voltage are measured, it is assumed that a maximum of the 4 peak electromagnetic forces is $F'_{max}$, and in order to ensure equivalent loading, the peak electromagnetic forces of the remaining 3 tensile discharge coils are increased. It is further assumed that any one of the remaining 3 peak electromagnetic forces is $F''_{max}$, and the branch equivalent resistor $R''$ corresponding to $F''_{max}$ is adjusted according to the formula (1) to increase the peak electromagnetic force $F''_{max}$ so as to make it equal to $F'_{max}$. According to the formula (1), an adjustment amount $\Delta R''$ of the branch equivalent resistor $R''$ corresponding to $F''_{max}$ meets:

$$\Delta R'' = (F'_{max} - F''_{max})/\kappa'' \qquad (2).$$

In the above formula, $\kappa''$ is a branch circuit constant corresponding to the tensile discharge coil corresponding to the peak electromagnetic force $F''_{max}$.

Figure 4:
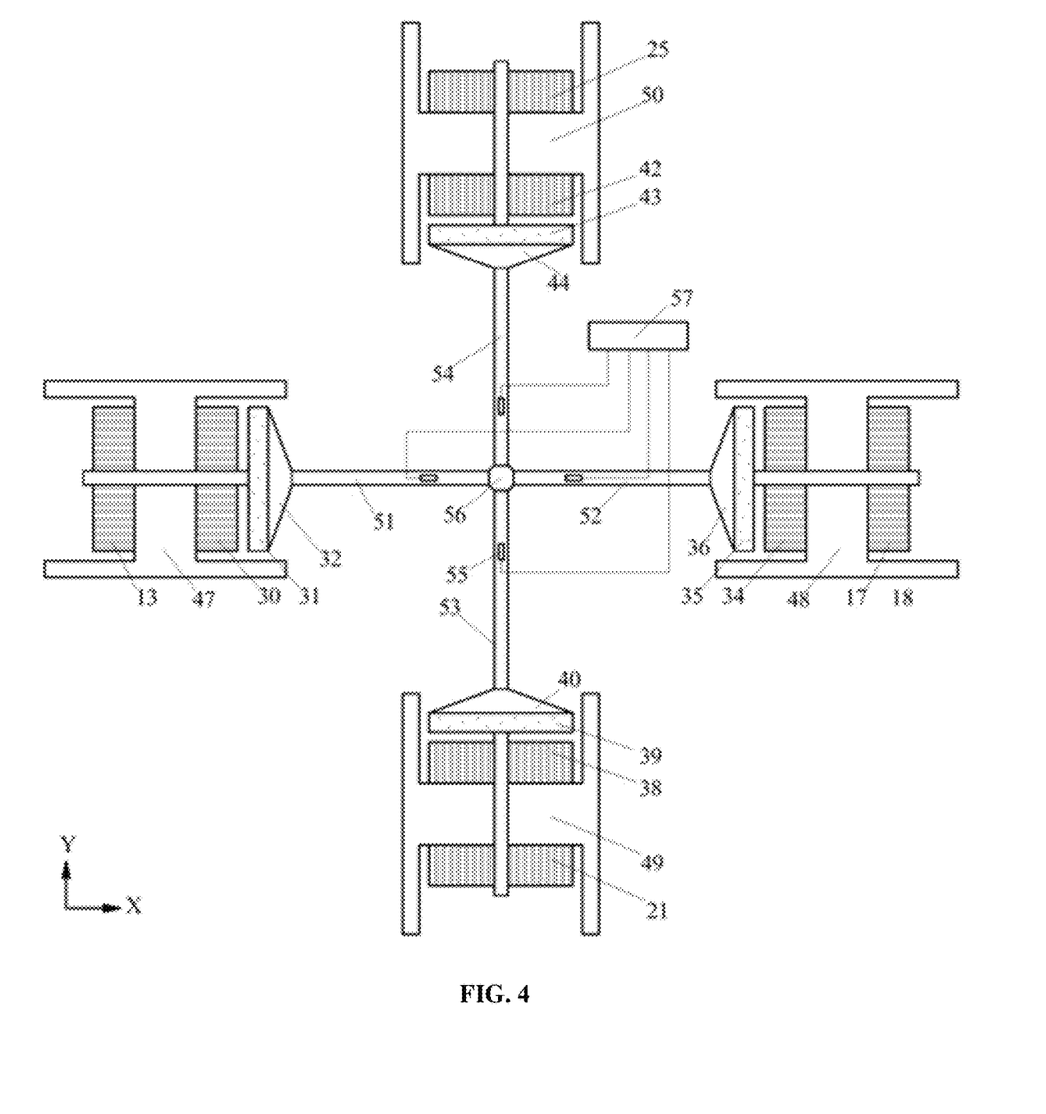
FIG. 4 is a schematic diagram of a biaxial bidirectional dynamic compressive loading test of the material according to the method of the present disclosure.

Specifically, during a compressive test, a method for ensuring biaxial bidirectional synchronous equivalent loading is the same as that of a tensile test, that is, a method for connecting 4 compressive discharge coils is the same as that of the tensile test, and a method for compensating peak electromagnetic forces of the 4 compressive discharge coils is the same as that of the tensile test.

Biaxial bidirectional synchronous equivalent loading of the implementation of the present disclosure includes the following specific operation processes.

Step 1, according to requirements of a loading test of the material, tensile loading or compressive loading is selected using a tensile/compressive loading test switch, a pulse width of a loading force is controlled using a capacitor bank and a number of turns of a discharge coil, and a peak loading force is controlled using a discharge voltage of the capacitor bank.

Step 2, the discharge voltage of the capacitor bank required for the loading test is set in a charging control unit, peak electromagnetic forces corresponding to the 4 discharge coils are measured under this discharge voltage, and the peak electromagnetic forces are compensated by adjusting branch equivalent resistor according to the formula (2), such that the peak electromagnetic forces of the 4 discharge coils after compensation are the same under this discharge voltage.

Step 3, a test piece is placed in a center of 4 loading bars, and the charging control unit is started to charge the capacitor bank.

Step 4, after charging is completed, a discharging control unit is started, the 4 discharge coils are discharged by the capacitor bank through a discharging SCR simultaneously, a changing strong magnetic field is excited by the 4 discharge coils, and an induced magnetic field of 4 secondary coils is further excited. The changing strong magnetic field of the 4 discharge coils interacts with the induced magnetic field of their respective secondary coils to generate an electromagnetic pulse force stress wave. Transverse symmetric equivalent loading is performed on the test piece by an electromagnetic pulse force through a No. 1 transverse loading bar and a No. 2 transverse loading bar respectively, and longitudinal symmetric equivalent loading is performed on the test piece through a No. 1 longitudinal loading bar and a No. 2 longitudinal loading bar. Strain signals in the 4 loading bars during loading are acquired by 4 strain gauges respectively and the signals are transmitted to a signal acquisition device.

Step 5, according to 4 strain and time signals acquired by the signal acquisition device, dynamic mechanical properties of the material under a biaxial bidirectional stress state are obtained.

Although the embodiments of the present disclosure have been illustrated and described, it should be understood that those of ordinary skill in the art may make various changes, modifications, replacements, and variations to the above embodiments without departing from the principle and spirit of the present disclosure, and the scope of the present disclosure is limited by the appended claims and their legal equivalents.

What is claimed is:

1. A system for testing dynamic properties of a material under a complex stress state, comprising:
    a loading system for loading the material;
    a control circuit system for controlling charging and discharging of the loading system; and
    a signal acquisition system for acquiring material strain and time signals during loading;
    wherein the loading system comprises a first transverse loading gun, a second transverse loading gun, a first longitudinal loading gun, a second longitudinal loading gun, and four loading bars;
    wherein the first transverse loading gun comprises a first transverse tensile branch equivalent resistor RT-X1, a first transverse tensile discharge coil, a first transverse tensile secondary coil, a first transverse tensile stress wave amplifier, a first transverse compressive branch equivalent resistor RB-X1, a first transverse compressive discharge coil, a first transverse compressive secondary coil, a first transverse compressive stress wave amplifier, and a first transverse loading gun base;
    wherein a through hole is disposed in a center of the first transverse loading gun base, the first transverse tensile discharge coil and the first transverse compressive discharge coil are symmetrically bolted on both ends of the first transverse loading gun base, the first transverse tensile secondary coil and the first transverse tensile stress wave amplifier are bolted to form a first transverse tensile loading head, the first transverse tensile loading head is coaxial with the first transverse tensile discharge coil, and surfaces of the first transverse tensile secondary coil and the first transverse tensile discharge coil are attached; and
    the first transverse compressive secondary coil and the first transverse compressive stress wave amplifier are bolted to form a first transverse compressive loading head, the first transverse compressive loading head is coaxial with the first transverse compressive discharge coil, and surfaces of the first transverse compressive secondary coil and the first transverse compressive discharge coil are attached.

2. The system according to claim 1, wherein the four loading bars are identical, the four loading bars comprising a first transverse loading bar, a second transverse loading bar, a first longitudinal loading bar, and a second longitudinal loading bar;
    one end of the first transverse loading bar is connected with the first transverse loading gun, and the other end of the first transverse loading bar is configured to be connected with a test piece to perform tensile/compressive loading on a left side of the test piece;
    one end of the second transverse loading bar is connected with the second transverse loading gun, and the other end of the second transverse loading bar is connected with the test piece to perform tensile/compressive loading on a right side of the test piece;
    one end of the first longitudinal loading bar is connected with the first longitudinal loading gun, and the other end of the first longitudinal loading bar is connected with the test piece to perform tensile/compressive loading on a lower part of the test piece; and one end of the second longitudinal loading bar is connected with the second longitudinal loading gun, and the other end of the second longitudinal loading bar is connected with the test piece to perform tensile/compressive loading on an upper part of the test piece.

3. The system according to claim 1, wherein the control circuit system comprises a booster, a charging silicon controlled rectifier (SCR), a rectifier diode, a charging control unit, a current-limiting resistor, a filter inductor, a capacitor bank, a bleeder resistor, a bleeder switch, a discharging SCR, a discharging control unit, a uniaxial and biaxial loading switch, and a tensile/compressive loading test switch; and the booster is configured to boost a 380 V alternating current, and the charging control unit is configured to, after boosting, control the charging SCR to charge the capacitor bank;

during charging, the rectifier diode is configured to rectify the alternating current, the filter inductor is configured to filter a charging current, and the current-limiting resistor is configured to limit a current of the charging circuit to protect the capacitor bank at the same time;

after the capacitor bank is charged, the discharging control unit is configured to control the discharging SCR to discharge the loading system, and the loading system is configured to excite an electromagnetic force to load the material;

after the capacitor bank is discharged but the loading system is not discharged, the bleeder switch is configured to be closed so that the bleeder resistor consumes excess energy stored in the capacitor bank;

the uniaxial and biaxial loading switch is configured to be used for switching between uniaxial loading and biaxial loading, the switch is opened for a biaxial loading test, and the switch is closed for a uniaxial loading test; and the tensile/compressive loading test switch is configured to be used for switching between a tensile test and a compressive test of the material.

4. The system according to claim 1, wherein the signal acquisition system comprises:

four strain gauges, attached to a first transverse loading bar, a second transverse loading bar, a first longitudinal loading bar, and a second longitudinal loading bar respectively to sense loading stress during loading; and a signal acquisition device, connected to output terminals of the four strain gauges to acquire strain and time signals.

5. The system according to claim 1, wherein a first transverse tensile discharge coil, a second transverse tensile discharge coil, a first longitudinal tensile discharge coil, and a second longitudinal tensile discharge coil are configured to be controlled for discharging by the same capacitor bank through the same discharging SCR during a tensile test, so four discharge coils are discharged synchronously and the four loading guns are loaded synchronously; and the four tensile discharge coils are connected with the discharging SCR by a parallel connection or a hybrid connection.

6. The system according to claim 1, wherein peak electromagnetic forces of tensile discharge coils are compensated by a branch equivalent resistor corresponding to the tensile discharge coils, such that peak loading forces excited by the four tensile discharge coils during loading are the same, so as to realize biaxial bidirectional equivalent loading; and the peak electromagnetic force $F_{max}$ generated by the four tensile discharge coils and their respective branch equivalent resistor R meet a formula:

$$F_{max}=\kappa R+\beta \qquad (1),$$

where $\kappa$ and $\beta$ are circuit constants corresponding to the discharge coils respectively.

7. A method for testing dynamic properties of a material under a complex stress state, comprising:

selecting tensile loading or compressive loading using a tensile/compressive loading test switch, controlling a pulse width of a loading force using a capacitor bank and a number of turns of a discharge coil, and controlling a peak loading force using a discharge voltage of the capacitor bank;

setting the discharge voltage of the capacitor bank required for the loading test in a charging control unit, measuring peak electromagnetic forces corresponding to four discharge coils under the discharge voltage, and compensating for the peak electromagnetic forces by adjusting a branch equivalent resistor, such that the peak electromagnetic forces of the four discharge coils after compensation are the same under the discharge voltage;

placing a test piece in a center of four loading bars, and starting the charging control unit to charge the capacitor bank;

after charging of the capacitor bank is completed, starting a discharging control unit, simultaneously discharging the four discharge coils by the capacitor bank through a discharging SCR, exciting a changing magnetic field by the four discharge coils, and further exciting an induced magnetic field of four secondary coils, wherein the changing magnetic field of the four discharge coils interacts with the induced magnetic field of their respective secondary coils to generate an electromagnetic pulse force stress wave; performing transverse symmetric equivalent loading on the test piece by an electromagnetic pulse force through a first transverse loading bar and a second transverse loading bar respectively, and performing longitudinal symmetric equivalent loading on the test piece through a first longitudinal loading bar and a second longitudinal loading bar; and acquiring strain signals in the four loading bars during loading by four strain gauges respectively and transmitting the signals to a signal acquisition device; and according to four strain and time signals acquired by the signal acquisition device, obtaining dynamic mechanical properties of the material under a biaxial bidirectional stress state.

8. A system for testing dynamic properties of a material under a complex stress state, comprising:

a loading system for loading the material;

a control circuit system for controlling charging and discharging of the loading system; and a signal acquisition system for acquiring material strain and time signals during loading;

wherein peak electromagnetic forces of tensile discharge coils are compensated by a branch equivalent resistor corresponding to the tensile discharge coils, such that peak loading forces excited by the four tensile discharge coils during loading are the same, so as to realize biaxial bidirectional equivalent loading; and the peak electromagnetic force $F_{max}$ generated by the four tensile discharge coils and their respective branch equivalent resistor R meet a formula:

$$F_{max}=\kappa R+\beta \qquad (1),$$

where κ and β are circuit constants corresponding to the discharge coils respectively.

9. The system according to claim 8, wherein the loading system comprises a first transverse loading gun, a second transverse loading gun, a first longitudinal loading gun, a second longitudinal loading gun, and four loading bars.

10. The system according to claim 9, wherein the first transverse loading gun comprises a first transverse tensile branch equivalent resistor RT-X1, a first transverse tensile discharge coil, a first transverse tensile secondary coil, a first transverse tensile stress wave amplifier, a first transverse compressive branch equivalent resistor RB-X1, a first transverse compressive discharge coil, a first transverse compressive secondary coil, a first transverse compressive stress wave amplifier, and a first transverse loading gun base;
wherein a through hole is disposed in a center of the first transverse loading gun base, the first transverse tensile discharge coil and the first transverse compressive discharge coil are symmetrically bolted on both ends of the first transverse loading gun base, the first transverse tensile secondary coil and the first transverse tensile stress wave amplifier are bolted to form a first transverse tensile loading head, the first transverse tensile loading head is coaxial with the first transverse tensile discharge coil, and surfaces of the first transverse tensile secondary coil and the first transverse tensile discharge coil are attached; and
the first transverse compressive secondary coil and the first transverse compressive stress wave amplifier are bolted to form a first transverse compressive loading head, the first transverse compressive loading head is coaxial with the first transverse compressive discharge coil, and surfaces of the first transverse compressive secondary coil and the first transverse compressive discharge coil are attached.

11. The system according to claim 9, wherein the four loading bars are identical, comprising a first transverse loading bar, a second transverse loading bar, a first longitudinal loading bar, and a second longitudinal loading bar;
one end of the first transverse loading bar is connected with the first transverse loading gun, and the other end of the first transverse loading bar is configured to be connected with a test piece to perform tensile/compressive loading on a left side of the test piece;
one end of the second transverse loading bar is connected with the second transverse loading gun, and the other end of the second transverse loading bar is connected with the test piece to perform tensile/compressive loading on a right side of the test piece;
one end of the first longitudinal loading bar is connected with the first longitudinal loading gun, and the other end of the first longitudinal loading bar is connected with the test piece to perform tensile/compressive loading on a lower part of the test piece; and
one end of the second longitudinal loading bar is connected with the second longitudinal loading gun, and the other end of the second longitudinal loading bar is connected with the test piece to perform tensile/compressive loading on an upper part of the test piece.

12. The system according to claim 8, wherein the control circuit system comprises a booster, a charging silicon controlled rectifier (SCR), a rectifier diode, a charging control unit, a current-limiting resistor, a filter inductor, a capacitor bank, a bleeder resistor, a bleeder switch, a discharging SCR, a discharging control unit, a uniaxial and biaxial loading switch, and a tensile/compressive loading test switch; and
the booster is configured to boost a 380 V alternating current, and the charging control unit is configured to, after boosting, control the charging SCR to charge the capacitor bank; during charging, the rectifier diode is configured to rectify the alternating current, the filter inductor is configured to filter a charging current, and the current-limiting resistor is configured to limit a current of the charging circuit to protect the capacitor bank at the same time; after the capacitor bank is charged, the discharging control unit is configured to control the discharging SCR to discharge the loading system, and the loading system is configured to excite an electromagnetic force to load the material; after the capacitor bank is discharged but the loading system is not discharged, the bleeder switch is configured to be closed so that the bleeder resistor consumes excess energy stored in the capacitor bank; the uniaxial and biaxial loading switch is configured to be used for switching between uniaxial loading and biaxial loading, the switch is opened for a biaxial loading test, and the switch is closed for a uniaxial loading test; and the tensile/compressive loading test switch is configured to be used for switching between a tensile test and a compressive test of the material.

13. The system according to claim 8, wherein the signal acquisition system comprises:
four strain gauges, attached to a first transverse loading bar, a second transverse loading bar, a first longitudinal loading bar, and a second longitudinal loading bar respectively to sense loading stress during loading; and
a signal acquisition device, connected to output terminals of the four strain gauges to acquire strain and time signals.

14. The system according to claim 8, wherein a first transverse tensile discharge coil, a second transverse tensile discharge coil, a first longitudinal tensile discharge coil, and a second longitudinal tensile discharge coil are configured to be controlled for discharging by the same capacitor bank through the same discharging SCR during a tensile test, so four discharge coils are discharged synchronously and four loading guns are loaded synchronously;
the four tensile discharge coils are connected with the discharging SCR by a parallel connection or a hybrid connection.

* * * * *